(12) United States Patent
Foo et al.

(10) Patent No.: US 10,898,876 B2
(45) Date of Patent: Jan. 26, 2021

(54) SORBENT COMPOSITION FOR AN ELECTROSTATIC PRECIPITATOR

(71) Applicant: S. A. Lhoist Recherche et Developpement, Ottignies-Louvain-la-neuve (BE)

(72) Inventors: Rodney Foo, Rayleigh (GB); Gregory Martin Filippelli, Dillsburg, PA (US); Johan Heiszwolf, Huldenberg (BE)

(73) Assignee: S.A. Lhoist Recherche et Development, Ottignies-Louvain-la-neuve (BE)

( * ) Notice: Subject to any disclaimer, the term of this patent is extended or adjusted under 35 U.S.C. 154(b) by 634 days.

(21) Appl. No.: 15/657,294

(22) Filed: Jul. 24, 2017

(65) Prior Publication Data

US 2019/0022621 A1 Jan. 24, 2019

(51) Int. Cl.
*B01J 20/04* (2006.01)
*B01J 20/28* (2006.01)

(52) U.S. Cl.
CPC ........... *B01J 20/043* (2013.01); *B01J 20/041* (2013.01); *B01J 20/28059* (2013.01); *B01J 20/28071* (2013.01); *B01D 2251/404* (2013.01); *B01D 2251/604* (2013.01)

(58) Field of Classification Search
CPC .. B01J 20/043; B01J 20/041; B01J 20/28059; B01J 20/28071; B01D 2251/404; B01D 2251/604
See application file for complete search history.

(56) References Cited

U.S. PATENT DOCUMENTS

| | | | | |
|---|---|---|---|---|
| 4,861,568 A | * | 8/1989 | Robinson, Jr. ....... | B01D 53/501 423/242.5 |
| 5,298,473 A | * | 3/1994 | Pinnavaia ............ | B01D 53/508 502/84 |

* cited by examiner

*Primary Examiner* — Daniel C. McCracken
(74) *Attorney, Agent, or Firm* — Whitaker Chalk Swindle & Schwartz PLLC; Charles Gunter

(57) ABSTRACT

A powdery calcium-magnesium compound, sorbent composition is shown which is based on calcium-magnesium. The compound is used in flue gas treatment and has characteristics which make it particularly compatible with electrostatic precipitators used in flue gas treatment installations.

29 Claims, 1 Drawing Sheet

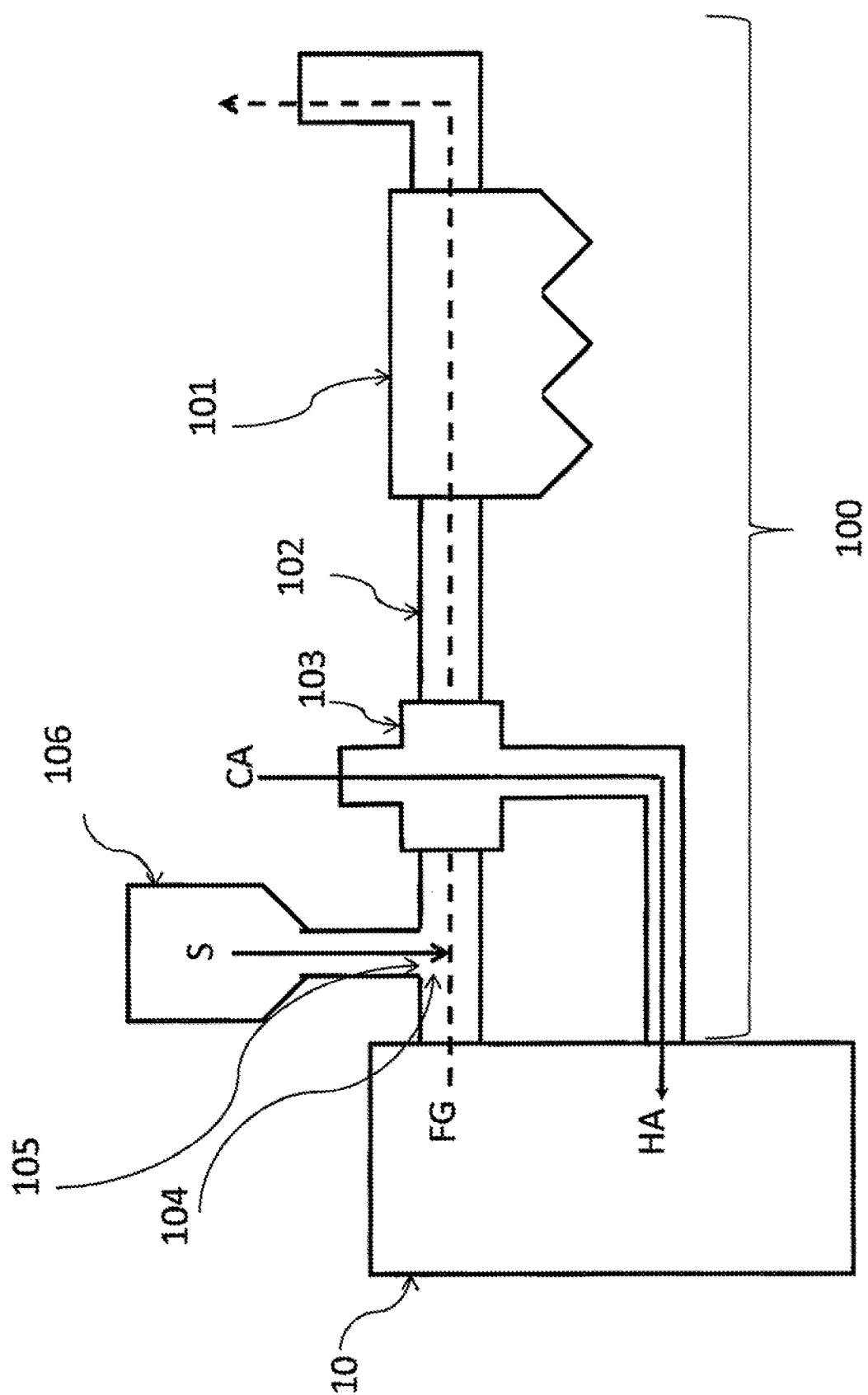

SORBENT COMPOSITION FOR AN ELECTROSTATIC PRECIPITATOR

BACKGROUND OF THE INVENTION

1. Field of the Invention

The present invention relates to a calcium-magnesium compound and to a sorbent composition for use in flue gas installation equipped with an electrostatic precipitator, a method for obtaining such sorbent composition and a process of flue gas treatment using an electrostatic precipitator which comprises a step of injecting such a sorbent composition. In another aspect, the present invention is related to a flue gas treatment installation using the sorbent composition according to the invention.

2. Description of the Prior Art

Fuel combustion in industrial processes or energy production generates fly ashes and acid gas for which their release in the atmosphere has to be minimized. The removal of fly ash from flue gas streams can be performed by an electrostatic precipitator (ESP). Some examples of electrostatic precipitators are described in U.S. Pat. Nos. 4,502,872, 8,328,902 or 6,797,035. An electrostatic precipitator generally comprises a shell with a flue gas inlet and a flue gas outlet, the shell enclosing a plurality of collection electrodes, and discharge electrodes spaced from each other and a plurality of hoppers positioned under the collecting plates. A voltage is applied between the discharge electrodes and the collection electrodes such as to create an electrostatic field charging the particulate material in the flue gas to obtain charged particulate material. The charged particulate material is collected by the collecting electrodes. The electrostatic precipitator further comprises rappers which provide mechanical shocks or vibrations to the collecting electrodes to remove the collected particles from the collecting electrodes. The collected particles fall down into hoppers arranged at the bottom of the shell and which are periodically or continuously emptied. The collecting electrodes can be planar or in a form of tubular or honeycomb structure and the discharge electrodes, are generally under the form of a wire or a rod.

Generally, the flue gas treatment installations including electrostatic precipitators are provided with an air preheater, which latter being sometimes included in a boiler and/or otherwise provided as an additional element of the flue gas installation. The air preheater comprises a heat exchanger transferring the heat from the flue gas stream produced by the boiler to heat the combustion air to the boiler to increase the thermal efficiency of the boiler. In some embodiments, the flue gas treatment comprises multiple electrostatic precipitators. Cold-side electrostatic precipitators are located downstream the air preheater, thereby operate at lower temperatures generally less than 200° C. (392° F.). Hot side electrostatic precipitators are located upstream the air preheater and operate at higher temperatures, generally more than 250° C. (482° F.).

Sometimes for existing plants, the electrostatic precipitator units already operate at the boundary of their design capability due to more stringent particulate matter emission limits that have been introduced over the years and/or changes to plant operating conditions such as fuel switching. The equation of Deutsch-Anderson describes with some approximations the collection efficiency of an electrostatic precipitator as:

$$\eta = 1 - \exp\left(-\frac{V_{pm} A_c}{Q}\right)$$

Wherein $\eta$ is the fractional collection efficiency, $A_c$ is the area of the collection electrode, $V_{pm}$ is the particle migration velocity and $Q$ is the volumetric flow rate of gas. The properties of the particles that influence collection efficiency are primarily the particle size distribution and their resistivity. The resistivity of the particles influences the particle migration velocity as described previously in the Deutsch-Anderson equation.

Various attempts have been tried to reduce the resistivity of particles. It is known for example from U.S. Pat. No. 4,439,351 that for an electrostatic precipitator to work efficiently, the electrical resistivity of the fly ash must be within 1E7 ($1 \times 10^7$) to 2E10 ($2 \times 10^{10}$) ohms·cm. Another document, Mastropietro, R. A. Impact of Hydrated Lime Injection on Electrostatic Percipitator Performance in ASTM Symposium on Lime Utilization; 2012; pp 2-10, states that the resistivity of fly ash should be within 1E8 ($1 \times 10^8$) to 1E11 ($1 \times 10^{11}$) ohms·cm. However the electrical resistivity of fly ash is generally higher and chemical additives were used such as $SO_3$, HCl, $NH_3$, $Na_2CO_3$, $Na_2SO_4$ and $NH(CH_2CH_2OH)$ to lower the resistivity of fly ash. However, those additives are susceptible to release undesired compounds. The same document discloses the use of polymers for lowering the resistivity of fly ash. However polymer additives generally degrade at high temperatures and must be injected to the flue gas stream at low temperatures.

Document U.S. Pat. No. 6,126,910 discloses the removal of acid gas from a flue gas with an electrostatic precipitator by spraying a solution of sodium bisulfite, calcium bisulfite, magnesium bisulfite potassium bisulfite or ammonium bisulfite or a combination thereof into a stream of gas upstream to the electrostatic precipitator unit. Such bisulfite salts selectively remove the acidic a gases such as HCl, HF and $SO_3$ but they don't remove sulfur dioxide. Sulfur dioxide in the flue gas has to be removed afterwards with a reagent such as hydrated lime. Document U.S. Pat. No. 6,803,025 discloses a similar process using a reaction compound selected from the group consisting of sodium carbonate, sodium bicarbonate, sodium hydroxide, ammonium hydroxide, potassium hydroxide, potassium hydroxide, potassium carbonate and potassium bicarbonate to remove acidic gases such as HCl, HF, $SO_3$ and partially $SO_2$ from the flue gas. However, remaining $SO_2$ still has to be removed by using another reagent such as hydrated lime. For the treatment of flue gas released by power plants, the amounts of chloride released by burning fuel or coal are generally very low respect to the $SO_2$, therefore the flue gas treatment process can be simplified by using only hydrated lime as a sorbent.

The document WO2015/119880 relates to the drawbacks of trona or hydrated lime as sorbents for flue gas treatment process with electrostatic precipitator units. Sodium based sorbents are known to decrease the resistivity of particulate matter, however a main drawback of the use of sodium sorbents is the leaching of heavy metals from the fly ash is enhanced leading to potential environmental contamination. Calcium hydroxide based sorbents do not present the problem of heavy metal leaching from fly ash, but they are known to increase resistivity of the particulate matter (fly ash) entrained in the flue gas stream so that the efficiency of the electrostatic precipitator unit may be lowered when calcium based sorbents are used. The same document discloses a composition for reducing particulate resistivity in a flue gas and for capturing acid gases, wherein the composition comprises an alkali metal/alkali earth particulate having a formula $(Li_{1-\alpha-\beta}Na_\alpha K_\beta)_w(Mg_{1-\delta}Ca_\delta)_x(OH)_y(CO_3)_x \cdot nH_2O$, more specifically a formula $Na_wCa_x(OH)_y(CO_3)_z \cdot nH_2O$ wherein a ratio of W to x is about 1/3 to about 3/1. Therefore the composition still presents a high amount of sodium which would be likely to not only leach itself, but sodium is also know to increase the leaching of heavy metals contained in the fly ash.

U.S. Pat. No. 6,797,035 discloses a process for reducing the resistivity of fly ash by spraying an aqueous solution of potassium nitrate or potassium nitrite on the stream of flue gas or by injecting powder of potassium nitrate or potassium nitrite into the duct through which the flue gas flows. A drawback of using those powders of nitrate or nitrite salts is that they react with other species than fly ash and results in less reactive chemical reaching the collection plates of the electrostatic precipitator. Therefore, it is suggested to inject those nitrate salts as finely divided powders to reduce the exposed reactive surface area and inhibit reactions with nitrous oxides and sulfur oxides.

U.S. Pat. No. 7,744,678 B2 discloses a method where addition of an alkali metal species, comprising sodium, between 0.2 and 3.5 wt %, to calcium hydroxide sorbents provides an improved reactivity towards $SO_2$ capture. Addition of the alkaline metal species is carried out in such a way that the BET specific surface area (SSA) by nitrogen adsorption remains high at 30<SSA<40 (m$^2$/g). The combination of sodium salts and hydrated lime beyond concentrations mentioned in U.S. Pat. No. 7,744,678 B2 is undesired because of three adverse effects: (1) increase of the sodium content will lead to increased leaching of heavy metals from the fly ash residue, (2) in hydrated lime mixtures of sodium salts yield to a reaction which takes place in the presence of water to form sodium hydroxide thus increasing the pH of said mixture to values above pH=12.5 thus causing safety issues, (3) addition of sodium in aqueous form to hydrated lime reduces the BET specific surface area of the hydrated lime thus reducing the reactivity towards acidic gases.

In the paper #49 presented at the power plant pollutant control and carbon management "MEGA" symposium, Aug. 16-19, 2016, Baltimore, Md., Foo et al. present a successful industrial application of $SO_2$ removal with an enhanced hydrated lime sorbent used in a cold side electrostatic precipitator. Laboratory resistivity measurements of fly ash mixtures with hydrated lime and enhanced hydrated lime have been performed with $CaSO_4$, wherein $CaSO_4$ was added to simulate typical fly ash residues. Enhanced hydrated lime of this paper has a surface area greater than 40 m$^2$/g, a pore volume greater than 0.2 cm$^3$/g and a median particle size $d_{50}$ comprised between 6 and 12 micrometers and has been found to present acceptable maximum resistivity of 1E11 ($1\times10^{11}$) Ohms·cm.

However, there is still a need to provide calcium-magnesium compound which can be advantageously used in flue gas treatment installations highly compatible with electrostatic precipitators.

The object of the present invention is to provide calcium-magnesium compound and sorbent composition comprising said calcium-magnesium compound removing the intrinsic drawback of these sorbents in their application in electrostatic precipitator units.

SUMMARY OF THE INVENTION

According to a first aspect, the present invention is related to powdery calcium-magnesium compound comprising at least a calcium-magnesium carbonate content greater or equal to 80 weight % or a calcium-magnesium hydroxide content greater or equal to 80 weight %, with respect to the total weight of the powdery calcium-magnesium compound, further presenting a resistivity at 300° C. (372° F.) $R_{300}$ lower than 1E11 ($1\times10^{11}$) Ohms·cm and higher than 1E7 ($1\times10^7$) Ohms·cm, advantageously lower than 1E10 ($1\times10^{11}$) Ohms·cm and higher than 5E7 ($1\times10^7$) Ohms·cm, preferably lower than 5E9 ($5\times10^9$) Ohms·cm, more preferably lower than 1E9 ($1\times10^7$) Ohms·cm, even more preferably lower than 5E8 ($5\times10^8$) Ohms·cm.

It was indeed surprisingly observed that a powdery calcium-magnesium compound can be successfully used in flue gas treatment using electrostatic precipitators when the resistivity at 300° C. (372° F.) is still lower than 1E11 ($1\times10^{11}$) Ohms·cm, preferably lower than 1E10 ($1\times10^{10}$) Ohms·cm, meaning that the powdery calcium-magnesium compound is robust and does not decompose at relatively high temperature. Accordingly, this powdery calcium-magnesium compound is able to positively modify the fly-ash resistivity without impacting negatively the operation of the electrostatic precipitator.

Indeed, if the powdery calcium-magnesium is a calcium-magnesium compound comprising at least a calcium-magnesium carbonate content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it will be preferably injected at a location near to the boiler or even in the boiler as in that location of the flue gas flow inside which the calcium-magnesium compound is to be injected, the temperature is favorable for a proper capture of polluting compounds of the flue gases by the high carbonate content. In this case, as the product does not decompose, the resistivity at a temperature of 300° C. (372° F.) is still low enough to modify the resistivity of the mixture of the fly ashes present in the flue gas and the calcium-magnesium compound injected.

By the terms calcium-magnesium compound with a calcium-magnesium carbonate content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it is meant within the meaning of the present invention natural calcium and/or magnesium carbonate such a dolomite, limestone, or even precipitated carbonate of calcium and/or magnesium.

The molar proportion of calcium to magnesium in dolomite can vary from 0.8 to 1.2. In the calcium-magnesium compound, the proportion of calcium to magnesium can be also higher or lower up to 0.01 to 10 or even 100. Indeed, natural limestone comprises magnesium carbonate at a level which can vary from 1 to 10 weight % with respect to the total weight of the powdery calcium-magnesium compound. If the compound in question is a magnesium carbonate, its content in calcium carbonate can also vary from 1 to 10 weight %.

The calcium-magnesium compound can also contain impurities. The impurities notably comprise all those which are encountered in natural limestones and dolomites, such as clays of the silico-aluminate type, silica, impurities based on iron or manganese.

Indeed, if the powdery calcium-magnesium compound is a calcium-magnesium compound comprising at least a calcium-magnesium hydroxide content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it will be preferably injected at a location near upstream the preheater as in that location of the flue gas flow inside which the calcium-magnesium compound is to be injected, the temperature is favorable for a proper capture of polluting compounds of the flue gases by the high hydroxide content. In this case, as the product does not decompose, the resistivity at a temperature of 300° C. (372° F.) is still low enough to modify the resistivity of the mixture of the fly ashes present in the flue gas and the calcium-magnesium compound injected.

By the terms calcium-magnesium compound with a calcium-magnesium hydroxide content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it is meant within the meaning of the present invention Said at least one calcium-magnesium compound according to the present invention is therefore at least formed with (calcitic) slaked lime, slaked dolomitic lime (or dolime), magnesium slaked lime.

The molar proportion of calcium to magnesium in dolomitic lime (also called dolime) can vary from 0.8 to 1.2. In the calcium-magnesium compound, the proportion of calcium to magnesium can be also higher or lower up to 0.01 to 10 or even 100. Indeed, natural limestone which is baked to form quicklime, which latter being further slaked to provide hydrated lime comprises magnesium carbonate at a level which can vary from 1 to 10 weight % with respect to the total weight of the powdery calcium-magnesium compound. If the compound in question is a magnesium carbonate which is baked to form magnesium oxide, which latter being further slaked to provide magnesium hydroxide, its content in calcium carbonate can also vary from 1 to 10 weight %. It has to be noted that a part of the magnesium oxide might remain unslaked.

The calcium-magnesium compound can also contain impurities. The impurities notably comprise all those which are encountered in natural limestones and dolomites, such as clays of the silico-aluminate type, silica, impurities based on iron or manganese.

The $CaCO_3$, $MgCO_3$, $Ca(OH)_2$ and $Mg(OH)_2$ contents in calcium-magnesium compounds may easily be determined with conventional methods. For example, they may be determined by X fluorescence analysis, the procedure of which is described in the EN 15309 standard, coupled with a measurement of the loss on ignition and a measurement of the $CO_2$ volume according to the EN 459-2:2010 E standard.

Preferably, the calcium-magnesium compound according to the present invention presents a maximum resistivity $R_{max}$ lower than 5E11 ($5 \times 10^{11}$) Ohms·cm, preferably lower than 1E11 ($1 \times 10^{11}$) Ohms·cm and more preferably lower than 5E10 ($5 \times 10^{10}$) Ohms·cm.

Advantageously, the calcium-magnesium compound is doped with at least one metallic ion M chosen in the group of the metallic ion having an atomic number less than or equal to 74 and belonging to the group consisting of a transition metal ion or a post-transition metal ion at an amount greater than or equal to 0.05 weight % and lower or equal to 5 weight % with respect to the total weight of the powdery calcium-magnesium compound.

In a particular embodiment, the calcium-magnesium compound according to the present invention is further doped with at least one counter ion X chosen in the group consisting of nitrates, nitrites, and their mixture at an amount greater than or equal to 0.05 weight % and lower or equal to 5 weight % with respect to the total weight of the powdery calcium-magnesium compound.

In a preferred embodiment of the calcium-magnesium compound according to the present invention, the total weight of said metallic ion and said counter ion is greater than or equal to 0.1 weight % and lower than or equal to 5 weight %, preferably between 0.3 and 3 weight %, with respect to the total weight of the powdery calcium-magnesium compound.

In yet another preferred embodiment, the calcium-magnesium compound of the invention further comprises sodium in an amount up to 3.5 weight % with respect to the total weight of the powdery calcium-magnesium compound, expressed as sodium equivalent. Preferably, sodium is in a minimum amount of 0.2 wt. % with respect to the total weight of the powdery calcium-magnesium compound and expressed as sodium equivalent.

Sodium under the form of sodium additive in such amounts is known to have a slight effect on decreasing the resistivity of the sorbent, as presented by Foo et al. (2016) document previously mentioned. The applicant found that sodium additive in such amounts in combination with the presence as described hereunder of at least a metallic ion and/or a counter ion further provides an additional effect on the decreasing of the resistivity of the sorbent composition. The use of sodium additive in combination with the presence as described hereunder of at least a metallic ion and/or a counter ion decreases the resistivity of sorbent composition more than when presence as described hereunder of at least a metallic ion and/or a counter ion is used alone in the calcium-magnesium compound and more than when sodium is used alone in the calcium-magnesium compound.

In an advantageous embodiment of the calcium-magnesium compound, the said metallic ion M is one of the ions among $Cu^{2+}$, $Fe^{2+}$, $Fe^{3+}$, $Mn^{2+}$, $Co^{2+}$, $Mo^{2+}$, $Ni^{2+}$, $Zn^{2+}$.

Preferably, the said metallic ion M is one of the ions among $Cu^{2+}$, $Fe^{2+}$, $Fe^{3+}$.

Preferably, the said counter ion X is nitrate.

It has been found that the presence of a metallic ion as disclosed hereabove and/or of a counter ion as described before in the calcium-magnesium compound, decreases the resistivity of the calcium-magnesium compound.

In a preferred embodiment, the powdery calcium-magnesium comprises particles having a $d_{50}$ comprised between 5 and 25 μm, preferably between 5 and 20 μm, more preferably between 5 and 16 μm.

The notation $d_X$ represents a diameter expressed in μm, as measured by laser granulometry in methanol optionally after sonication, relatively to which X % by mass of the measured particles are smaller or equal Preferably, in particular if the powdery calcium-magnesium compound is a calcium-magnesium compound comprising at least a calcium-magnesium hydroxide content greater than or equal to 80 weight %, the calcium-magnesium compound according to the invention has a BET specific surface area of at least 20 m$^2$/g, preferably of at least 25 m$^2$/g, preferably of at least 30 m$^2$/g, more preferably of at least 35 m$^2$/g. The BET surface area is determined by manometry with adsorption of nitrogen after degassing in vacuum at 190° C. (374° F.) for at least 2 hours and calculated according to the multipoint BET method as described in the ISO 9277/2010E standard.

Preferably, in particular if the powdery calcium-magnesium compound is a calcium-magnesium compound comprising at least a calcium-magnesium hydroxide content greater than or equal to 80 weight %, the sorbent composition according to the invention has a BJH pore volume of at least 0.1 cm$^3$/g, preferably of at least 0.15 cm$^3$/g, preferably of at least 0.17 cm$^3$/g, more preferably of at least 0.2 cm$^3$/g. The BJH pore volume is determined by manometry with desorption of nitrogen after degassing in vacuum at 190° C. (374° F.) for at least 2 hours and calculated according to the BJH method as described in the ISO 9277/2010E standard.

Other embodiments of the calcium-magnesium compound according to the present invention are mentioned in the appended claims According to a second aspect, the present invention also relates to a sorbent composition for flue gas treatment installation including an electrostatic precipitator comprising said calcium-magnesium compound according to the present invention.

Preferably, the sorbent composition according to the invention further comprises activated charcoal, lignite coke, halloysite, sepiolite, clays such as bentonite, kaolin, vermiculite or any other sorbent such as fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass.

In a preferred embodiment, the sorbent composition according to the present invention comprises sodium additive comprising sodium in an amount up to 3.5 weight % with respect to the total weight of the powdery calcium-magnesium compound and expressed as sodium equivalent. In particular, the amount of sodium in the composition would be higher than 0.2 weight % with respect to the total weight of the powdery sorbent composition.

In a preferred embodiment, the sorbent composition according to the present invention comprises said metallic ion M and/or said counter ion X being present at an amount greater than or equal to 0.05 weight % and lower or equal to 5 weight % with respect to the total weight of the powdery calcium-magnesium compound and wherein preferably the total weight of said metallic ion and said counter ion is greater than or equal to 0.1 weight % and lower than or equal to 5 weight %, preferably between 0.3 and 3 weight %, with respect to the total weight of the dry sorbent composition.

In a particular embodiment according to the present invention, the sorbent composition comprises water in such an amount that the sorbent composition is under the form of a suspension. Exemplary amounts can be from 40 to 90 weight % of water wherein the sorbent is comprised in an amount of 10 to 60 weight % with respect to the total weight of the sorbent composition under the form of a suspension.

The sorbent composition under the form of a suspension can be used for example in a spray dry absorber, which can be followed by an electrostatic precipitator.

In a particularly preferred embodiment, the said calcium-magnesium compound is hydrated lime. In this case, if the sorbent composition is under the form of a suspension, it will be under the form of a milk of lime where the solid content will be from 10 to 50 weight % with respect to the total weight of the milk of lime.

Other embodiments of the sorbent composition according to the present invention are mentioned in the appended claims.

According to a third aspect, the present invention is related to a process for manufacturing a sorbent composition for a flue gas treatment installation including an electrostatic precipitator, comprising the steps of:

a) providing a calcium-magnesium compound to a reactor;
b) adding an additive or a mixture of additives, comprising at least one metallic ion M and/or a counter ion X with M being a metallic ion having an atomic number less than or equal to 74 and is a transition metal ion or a post-transition metal ion, and X being one of the counter ion amongst nitrates, nitrites, oxides ($O^{2-}$), hydroxides ($OH^-$), and their mixture in an amount calculated to obtain between 0.1 weight % and 5 weight %, preferably between 0.3 weight % to 3 weight % of said metallic ion M and/or counter ion X in weight of dry sorbent composition.

Alternatively, the present invention is related to a process for manufacturing a sorbent composition for a flue gas treatment installation including an electrostatic precipitator, comprising the steps of:

a) providing a calcium-magnesium compound to a reactor;
b) adding an additive or a mixture of additives, comprising at least one metallic ion M and/or a counter ion X with M being a metallic ion having an atomic number less than or equal to 74 and is a transition metal ion or a post-transition metal ion, and X being one of the counter ion amongst nitrates, nitrites, oxides ($O^{2-}$), hydroxides ($OH^-$), and their mixture in an amount calculated to obtain between 0.1 weight % and 5 weight %, preferably between 0.3 weight % to 3 weight % of said metallic ion M and/or counter ion X in weight of calcium-magnesium compound.

In a preferred embodiment, the sorbent composition comprises particles having a $d_{50}$ comprised between 5 and 25 μm, preferably between 5 and 20 μm, more preferably between 5 and 16 μm.

In a preferred embodiment of the process according to the present invention, said calcium-magnesium compound comprises at least a calcium-magnesium carbonate content greater or equal to 80 weight % with respect to the total weight of the dry calcium-magnesium compound.

In another preferred embodiment of the process according to the present invention, said calcium-magnesium compound comprises a calcium-magnesium hydroxide content greater or equal to 80 weight %, with respect to the total weight of the dry calcium-magnesium compound.

Preferably in the process of manufacturing said sorbent composition, the said metallic ion M is one of the ions among $Cu^{2+}$, $Fe^{2+}$, $Fe^{3+}$, $Mn^{2+}$, $Co^{2+}$, $Mo^{2+}$, $Ni^{2+}$, $Zn^{2+}$. More preferably in the process of manufacturing said sorbent composition said metallic ion M is one of the ions among $Cu^{2+}$, $Fe^{2+}$, $Fe^{3+}$.

Preferably in the process of manufacturing said sorbent composition, said counter ion X is nitrate. Preferably the process of manufacturing said sorbent composition comprises a step of adding another additive comprising sodium expressed as sodium equivalent in an amount calculated to obtain up to 3.5% of sodium equivalent in weight of the dry sorbent composition.

In an embodiment of the process of manufacturing according to the invention, the step of providing to a calcium-magnesium compound to a reactor comprises the step of providing a quicklime to said reactor, slaking said quicklime with a predetermined amount of water to obtain said calcium-magnesium compound comprising at least a calcium hydroxide content greater or equal to 80 weight %, with respect to the total weight of the dry calcium-magnesium compound with an predetermined amount of moisture.

More advantageously, said step of slaking is performed in conditions such as to obtain hydrated lime with a BET specific surface area by nitrogen adsorption of at least 20 m$^2$/g, preferably of at least 25 m$^2$/g, preferably of at least 30 m$^2$/g, more preferably of at least 35 m$^2$/g.

In further preferred embodiment, said step of slaking is performed in conditions such as to obtain hydrated lime with a BJH pore volume for pores having a diameter lower or equal to 1000 Å by nitrogen desorption of at least 0.1 cm$^3$/g, 0.15 cm$^3$/g, preferably of at least 0.17 cm$^3$/g, more preferably of at least 0.2 cm$^3$/g.

Preferably, said step of slaking is performed in the same conditions as the ones described in U.S. Pat. No. 6,322,769 of the applicant and incorporated by reference.

In an alternative embodiment of the process of manufacturing according to the invention, the said step of slaking is performed in the same conditions as the ones described in the U.S. Pat. No. 7,744,678 of the applicant and incorporated by reference.

In an embodiment of the process of manufacturing said sorbent according to the invention, the step of adding an additive or a mixture of additives, comprising at least one metallic ion M and/or a counter ion X is performed before said step of slaking quicklime.

In another embodiment of the process of manufacturing said sorbent composition, the said step of adding an additive or a mixture of additives, comprising at least one metallic ion M and/or a counter ion X is performed during said step of slaking quicklime.

Alternatively, in the process of manufacturing said sorbent composition, the said step of adding an additive or a mixture of additives, comprising at least one metallic ion M and/or a counter ion X is performed after the said step of slaking quicklime.

It has been found by the applicant that the step of adding an additive or a mixture of additives, comprising at least one metallic ion M and/or a counter ion X is performed during or after the said step of slaking does not substantially change the specific surface area nor the pore volume of the calcium-magnesium compound, for example as sorbent. In particular, the specific surface area and the pore volume of the sorbent composition according to the present invention is substantially the same as for calcium hydroxide sorbent prepared by the known methods such as the one described in U.S. Pat. Nos. 6,322,769 and 7,744,678 incorporated by reference. Therefore, the properties of the sorbent ensuring the efficiency of SO$_2$ removal are preserved.

Preferably, the said process of manufacturing is characterized in that it further comprises a step of adding activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass, preferably performed after the said step of slaking.

Other embodiments of the process for manufacturing a sorbent composition according to the present invention are mentioned in the appended claims.

In a fourth aspect, the present invention is related to a flue gas treatment process using an installation comprising an injection zone arranged upstream an electrostatic precipitator, characterized in that it comprises a step of injecting in said injection zone a sorbent composition according to the present invention.

More particularly, the flue gas treatment process using an installation including an electrostatic precipitator, and an injection zone arranged upstream said electrostatic precipitator and through a which flue gas is flowing towards said electrostatic precipitator is characterized in that the said process comprises a step of injection of a sorbent composition in said injection zone, said sorbent composition comprising a calcium-magnesium sorbent, at least one metallic ion M having an atomic number less than or equal to 74 and being a transition metal ion or a post-transition metal ion, and optionally at least a counter ion X chosen amongst nitrates, nitrites, and their mixture, the total amount of said at least one metallic ion M and said optionally at least one counter ion X being comprised between 0.1% and 5%, preferably 0.3 to 3.5% in weight of the dry composition.

According to the present invention, the said sorbent composition has a lower resistivity compared to calcium-magnesium sorbents of prior art, especially at a temperature of 300° C. (372° F.). Injection of the sorbent composition according to the invention in an injection zone to mix with flue gas is effective for the removal of SO$_2$ and other gaseous acids and the lower resistivity of such sorbent composition improves the collection of particulate matter on the collecting electrodes of the electrostatic precipitator.

In a preferred embodiment of the process according to the present invention, the sorbent composition comprises as calcium-magnesium compound at least a calcium-magnesium carbonate, and said sorbent composition is injected in said injection zone, wherein said flue gas has a temperature greater than or equal to 850° C. (1562° F.).

In another preferred embodiment of the process according to the present invention, the sorbent composition comprises a calcium-magnesium compound at least a calcium-magnesium hydroxide, and said sorbent composition is injected in said injection zone wherein said flue gas has a temperature greater than or equal to 180° C. (356° F.), preferably greater than 200° C. (392° F.), more preferably comprised between 300° C. (372° F.) and 425° C. (797° F.).

Preferably, in the flue gas treatment process according to the invention, the said calcium-magnesium compound in the sorbent composition is mixed with an additive or a mixture of additives, comprising at least one metallic ion M and/or a counter ion X before the said step of injection.

Alternatively, in the flue gas treatment process according to the invention, the calcium-magnesium compound and an additive or a mixture of additives, comprising at least one metallic ion M and/or a counter ion X are injected separately and mixed with said flue gas in the said injection zone.

The said sorbent composition can be used in the flue gas treatment process according to the present invention under a broad range of temperatures, for example between 100° C. (212° F.) and 425° C. (797° F.) or even higher when the sorbent composition mainly comprises carbonate sorbent (typically temperature higher than 850° C. (1562° F.)

Advantageously, the said additives of the sorbent composition according to the present invention do not encounter degradation at temperatures higher than 180° C. (356° F.) so that said sorbent composition can be injected in the said injection zone wherein the temperature is greater than or equal to 180° C. (356° F.), preferably greater than or equal to 300° C. (372° F.). As the injection zone is located upstream the air preheater, temperatures at the injection zone can range between 300° C. (372° F.) to 425° C. (797° F.), preferably 350° C. (662° F.) to 380° C. (716° F.).

Preferably, in the flue gas treatment process according to the invention, the said injection zone is located upstream an air preheater itself located upstream said electrostatic precipitator.

Preferably, in the flue gas treatment process according to the invention, the said ion M is one of the ions among $Cu^{2+}$, $Fe^{2+}$, $Fe^{3+}$, $Mn^{2+}$, $Co^{2+}$, $Mo^{2+}$, $Ni^{2+}$, $Zn^{2+}$.

More preferably, in the flue gas treatment process of the invention, the said ion M is one of the ions among $Cu^{2+}$, $Fe^{2+}$, $Fe^{3+}$.

Preferably, in the flue gas treatment process of the invention, said counter ion X is nitrate.

Preferably, in the flue gas treatment process of the invention, the said sorbent composition comprises another additive comprising sodium in an amount up to 3.5% in weight of the dry composition and expressed as sodium equivalent.

Preferably, in the flue gas treatment process of the invention, the said sorbent composition has a BET specific surface area of at least 20 m²/g.

Preferably, in the flue gas treatment process of the invention, the said sorbent composition has a BJH pore volume obtained from nitrogen desorption of at least 0.1 cm³/g.

Preferably, in the flue gas treatment process of the invention, the said sorbent composition has a BJH pore volume obtained from nitrogen desorption of at least 0.15 cm³/g, preferably of at least 0.17 cm³/g, more preferably of at least 0.2 cm³/g.

Preferably, in the flue gas treatment process of the invention, the said sorbent composition further comprises activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass.

Other embodiments of the flue gas treatment process according to the present invention are mentioned in the appended claims.

In a fifth aspect, the present invention is related to a flue gas treatment device comprising an electrostatic precipitator downstream of an air preheater, said air preheater being connected to said electrostatic precipitator by a duct, characterized in that it further comprises an injection zone for injecting a sorbent composition according to the present invention arranged upstream of said air preheater.

Other embodiments of the flue gas treatment device according to the present invention are mentioned in the appended claims.

Preferably the said flue gas treatment device or installation is used for treating flue gas of a plant, in particular a power plant, using coal or fuel containing sulfur species or other acid gas precursors.

Preferably the said flue gas treatment installation further comprises a reservoir comprising said sorbent composition to provide said sorbent composition to the said injection zone through a sorbent inlet

BRIEF DESCRIPTION OF THE DRAWINGS

FIG. 1 presents a schematic embodiment of a flue gas treatment installation carrying out the flue gas treatment process with the sorbent composition according to the present invention.

DETAILED DESCRIPTION OF THE INVENTION

According to a first aspect, the present invention is related to a sorbent composition for flue gas treatment installation including an electrostatic precipitator, said sorbent composition comprising calcium-magnesium compound, characterized in that it further comprises an additive or a mixture of additives in an amount comprised between 0.1% and 5%, preferably 0.3% to 3% in weight of the dry composition, said additive or additives containing at least one metallic ion M having an atomic number less than or equal to 74 and is a transition metal ion or a post-transition metal ion, and at least one counter ion X chosen amongst nitrates, nitrites, and their mixture.

In a preferred embodiment, the calcium-magnesium compound is based on hydrated lime.

Calcium hydroxide sorbents are manufactured by reacting (or slaking) calcium oxide, CaO or quick lime, with water in a so called hydrator, also called slaking unit. Alternatively, calcium magnesium hydroxide sorbents are manufactured by reacting dolomitic lime (also called dolime) or magnesium lime with water in a hydrator. Alternatively, quick lime and dolomitic lime can be mixed together and slaked with water in a hydrator to provide a mixture of calcium hydroxide and calcium magnesium hydroxide. In the following, the process of manufacturing of the sorbent composition will refer to quick lime but the process of manufacturing is not limited to quick lime as a starting material and dolomitic lime or a combination of dolomitic lime and/or magnesium lime and quick lime can also be used as starting materials.

The process of manufacturing of the said sorbent composition according to the invention comprises a step of slaking quicklime with a predetermined amount of water to obtain hydrated lime with an predetermined amount of moisture, and is characterized in that it comprises a step of adding an additive or a mixture of additives in an amount calculated to obtain between 0.1% and 5%, preferably between 0.3 and 3.5% of said additive or mixture of additives in weight of the dry sorbent composition, said additive or additives containing at least one metallic ion M having an atomic number less than or equal to 74 and is a transition metal ion or a post-transition metal ion, and at least one counter ion X chosen amongst nitrates, nitrites, $O^{2-}$, and $OH^-$ and their mixture.

In an embodiment of the process of manufacturing the said sorbent composition, the predetermined amount of water in the said step of slaking is in a water to lime ratio 2:1 by weight or higher.

In an embodiment of the process of manufacturing the said sorbent composition, the amount of water in the slaking step can be adapted to obtain a hydrated lime with a moisture less than or equal to 10 wt. %, preferably less than or equal to 5 wt. %, preferably less than or equal to 2 w %, more preferably less than or equal to 1 w % with respect to the total weight of the sorbent composition at a powdery state.

In another embodiment, the amount of water in the slaking step can be adapted to obtain a hydrated lime with a moisture content comprised between 5 wt. % and 20 wt. %. The amount of water in the slaking step can also be higher such as to obtain a hydrated lime with a moisture content above 20 wt. %, all % being expressed with respect to the total weight of the sorbent composition at a powdery state.

In an embodiment, the hydrated lime obtained after the slaking step is dried in a further step.

In an embodiment of the process of manufacturing of the sorbent composition according to the invention, the said additive containing at least one metallic ion M and at least one counter ion X is added as an aqueous solution or as a suspension or as a powder before or during the said step of slaking of calcium oxide or calcium magnesium oxide or a combination thereof.

In another embodiment of the process of manufacturing of the sorbent composition according to the invention, the said additive or mixture of additives containing at least one metallic ion M and at least one counter ion X is added as aqueous solution or as a suspension or as a powder after the said step of slaking. The said additive or mixture of additives containing at least one metallic ion M and at least one counter ion X is preferably added to calcium hydroxide or calcium magnesium hydroxide before injection in an injection zone of the flue gas treatment installation. Alternatively, the said additive or mixture of additives containing at least one metallic ion M and at least one counter ion X can be added during injection in an injection zone of the flue gas treatment installation, separately from the calcium hydroxide or calcium magnesium hydroxide and upstream the electrostatic precipitator.

In a preferred embodiment of the process of manufacturing of the sorbent composition, the said step of slaking quicklime is performed in the conditions such as to obtain hydrated lime with a BET specific surface area from nitrogen adsorption of at least 20 m$^2$/g and a BJH pore volume obtained from nitrogen desorption of at least 0.1 cm$^3$/g. Various processes are available to the man a skilled in the art to obtain an hydrated lime with such properties, and are disclosed for example in documents U.S. Pat. Nos. 6,322,769 and 7,744,678 of the applicant and incorporated by reference.

In the process of manufacturing the sorbent composition according to the invention, particles of quicklime are advantageously used having a particle size distribution of less than 5 mm, in particular quicklime particles of particle size distribution 0-2 mm.

Other processes for obtaining hydrated lime with high specific area and/or high pore volume can be found for example in U.S. Pat. No. 5,492,685 wherein an amount of alcohol such methanol or ethanol is added prior and/or the step of slaking quicklime and is removed after drying, in patent DE3620024 wherein sugar is added in the step of slaking for increasing the specific surface area and wherein glycols or amines are added to increase the flowability, in U.S. Pat. Nos. 5,277,837 and 5,705,141 wherein additives such as ethylene glycol, diethylene glycol, tri ethylene glycol, monoethanolamine, diethanolamine, triethanolamine or a combination thereof is added in the step of slaking for increasing the surface area of hydrated lime.

In the process of manufacturing the sorbent composition, the said additive or mixture of additives containing at least one metallic ion M and at least one counter ion X can be added before the said step of slaking, during the step of slaking or after the step of slaking without substantially changing the BET specific surface area nor the BJH pore volume for pores having a diameter lower than or equal to 1000 Å of the sorbent composition. Moreover the BET specific surface area and the BJH pore volume of the sorbent composition according to the present invention is substantially the same as for calcium hydroxide sorbent prepared by the known methods such as the one described in U.S. Pat. Nos. 6,322,769 and 7,744,678 incorporated by reference. Therefore, the properties of the sorbent ensuring the efficiency of SO$_2$ removal are preserved.

In the said process of manufacturing the sorbent composition according to the invention, if a hydrated lime composition is prepared according to the method described in U.S. Pat. No. 7,744,678, such method comprises a step of adding a quantity of an alkali metal, preferably sodium in an quantity to the quicklime or to the slaking water or to the hydrated lime, sufficient to obtain in the a hydrated lime an alkali metal content that is equal to or greater than 0.2% and equal or less than 3.5% by weight based on the total weight of the dry sorbent composition. According to this embodiment, the said additives or mixture of additives containing at least one metallic ion M and at least one counter ion X is further added to the quicklime or to the slaking water or to the hydrated lime with an amount such as to obtain a content in additive or in a mixture of additives containing at least one metallic ion M and at least one counter ion X between 0.1% and 5%, preferably 0.3% to 3% in weight of the dry sorbent composition.

Various sorbent compositions have been prepared according to the method of the present invention and measurements of the resistivity of dry powders of said sorbent compositions have been carried out in following the procedure outlined by IEEE (Esctcourt, 1984). Basically, a resistivity cell of a determined volume is filled by a dry powder of sorbent composition and the powder is then compacted with a weight such as to obtain a flat surface. An electrode with a guard is placed over the surface of the powder and the resistivity of the powder is measured in an oven under a stream of air comprising 10% of humidity at various temperatures comprised between 150° C. (302° F.) and 300° C. (372° F.). The resistivity of comparatives examples have been measured in the same conditions. For each measurement, a maximum resistivity Rmax and a resistivity at 300° C. (372° F.) has been determined. The resistivity measurements are presented herein after:

Example Set A

Example 1 is a comparative sample of calcium hydroxide sorbent designed for the removal of acid gas pollutants manufactured according to U.S. Pat. No. 6,322,769 B1. No sodium nor additive of general formula MX have been added.

Example 2 is a comparative sample of a calcium hydroxide sorbent designed for the removal of acid gas pollutants manufactured according to U.S. Pat. No. 7,744,678 B2. This sample comprises 1 wt. % of sodium as Na$_2$CO$_3$. No further sodium or additive of general formula MX has been added.

Example 3 is a calcium hydroxide sorbent manufactured according to the present invention using iron nitrate as dopant.

Table 1 shows the measured resistivity parameters $R_{max}$ and $R_{300}$.

TABLE 1

Resistivity parameters of calcium hydroxide sorbents doped with sodium and iron salts.

| Example | Composition | Na$_2$CO$_3$ (wt. %) | Fe(NO$_3$)$_3$ (wt. %) | Cu(NO$_3$)$_2$ (wt. %) | $R_{max}$ (Ω cm) | $R_{300}$ (Ω cm) |
|---|---|---|---|---|---|---|
| Ex. 1 | Ca(OH)$_2$ | 0 | 0 | 0 | 8E12 | 3E12 |
| Ex. 2 | Ca(OH)$_2$ + Na$_2$CO$_3$ | 1 | 0 | 0 | 4E11 | 1E11 |
| Ex. 33 | Ca(OH)$_2$ + Fe(NO$_3$)$_3$ | 0 | 0.5 | 0 | 1E12 | 2E10 |

From Table 1, it is clear that the both the $R_{max}$ value and the $R_{300}$ value of Example 1 are high at and above the preferred range of resistivity values comprised between 10E7 ohms·cm and 2E10 ohms·cm.

Addition of 1 wt. % of sodium in Example 2 reduces the $R_{max}$ and $R_{300}$ values by more than one order of magnitude. Surprisingly the addition of a small amount of iron nitrate at 0.5 wt % reduces the $R_{max}$ value by nearly one order of magnitude and by nearly two orders of magnitude for $R_{300}$. Surprisingly the addition of iron nitrate is more effective than the addition of sodium.

Example Set B

A set of sorbents was prepared by taking the sorbents manufactured according to U.S. Pat. No. 7,744,678 B2 and adding iron and copper salts according to the method of present invention to said sorbents. Example 4 is a sample of a calcium hydroxide sorbent designed for the removal of acid gas pollutants manufactured according to U.S. Pat. No. 7,744,678 B2 wherein an amount of iron nitrate has been added. According to the manufacturing method presented in U.S. Pat. No. 7,744,678 an amount of sodium has been added.

Example 5 is a sample of a calcium hydroxide sorbent designed for the removal of acid gas pollutants manufactured according to U.S. Pat. No. 7,744,678 B2 wherein an amount of copper nitrate has been added. According to the manufacturing method presented in U.S. Pat. No. 7,744,678 an amount of sodium has been added.

TABLE 2

Resistivity parameters of calcium hydroxide sorbents doped with sodium, iron and copper salts.

| Example | Composition | $Na_2CO_3$ (wt. %) | $Fe(NO_3)_3$ (wt. %) | $Cu(NO_3)_2$ (wt. %) | $R_{max}$ (Ω cm) | $R_{300}$ (Ω cm) |
|---|---|---|---|---|---|---|
| Ex. 1 | $Ca(OH)_2$ | 0 | 0 | 0 | 8E12 | 3E12 |
| Ex. 4 | $Ca(OH)_2 + Na_2CO_3 + Fe(NO_3)_3$ | 1 | 0.5 | 0 | 1E11 | 1E10 |
| Ex. 5 | $Ca(OH)_2 + Na_2CO_3 + Cu(NO_3)_2$ | 1 | 0 | 0.5 | 2E10 | 2E8 |

Table 2 shows that for these sorbents, the addition of an iron nitrate result in resistivity value $R_{max}$ nearly two orders of magnitude lower than that of the comparative Example 1. The addition of copper nitrate results in nearly three orders of magnitude lower resistivity for $R_{max}$ and more than three orders of magnitude resistivity drop of $R_{300}$.

Example Set C

A set of sorbent was prepared by taking the sorbents according to U.S. Pat. No. 7,744,678 and various irons salts have been added to measure the influence of the counter ion on the resistivity of the sorbent.

Example 4 is a sample of a calcium hydroxide sorbent designed for the removal of acid gas pollutants manufactured according to U.S. Pat. No. 7,744,678 B2 wherein an amount of iron nitrate has been added. According to the manufacturing method presented in U.S. Pat. No. 7,744,678 an amount of sodium has been added.

Example 6 is a comparative sample of a calcium hydroxide sorbent designed for the removal of acid gas pollutants manufactured according to U.S. Pat. No. 7,744,678 B2 wherein an amount of iron sulfate has been added. According to the manufacturing method presented in U.S. Pat. No. 7,744,678 an amount of sodium has been added.

Example 7 is a comparative sample of a calcium hydroxide sorbent designed for the removal of acid gas pollutants manufactured according to U.S. Pat. No. 7,744,678 B2 wherein an amount of iron acetate has been added. According to the manufacturing method presented in U.S. Pat. No. 7,744,678 an amount of sodium has been added.

TABLE 3

Resistivity parameters of calcium hydroxide sorbents using different iron salts.

| Example | Composition | $Na_2CO_3$ (wt. %) | $Fe(NO_3)_3$ (wt. %) | $Fe_2(SO_4)_3$ (wt. %) | $Fe(C_2H_3O_2)_2$ (wt. %) | $R_{max}$ (Ω cm) | $R_{300}$ (Ω cm) |
|---|---|---|---|---|---|---|---|
| Ex. 2 | $Ca(OH)_2 + Na_2CO_3$ | 1 | 0 | 0 | 0 | 4E11 | 1E11 |

TABLE 3-continued

Resistivity parameters of calcium hydroxide sorbents using different iron salts.

| Example | Composition | $Na_2CO_3$ (wt. %) | $Fe(NO_3)_3$ (wt. %) | $Fe_2(SO_4)_3$ (wt. %) | $Fe(C_2H_3O_2)_2$ (wt. %) | $R_{max}$ ($\Omega$ cm) | $R_{300}$ ($\Omega$ cm) |
|---|---|---|---|---|---|---|---|
| Ex. 4 | $Ca(OH)_2$ + $Na_2CO_3$ + $Fe(NO_3)_3$ | 1 | 0.5 | 0 | 0 | 1E11 | 1E10 |
| Ex. 6 | $Ca(OH)_2$ + $Na_2CO_3$ + $Fe_2(SO_4)_3$ | 1 | 0 | 0.5 | 0 | 2E12 | 2E12 |
| Ex. 7 | $Ca(OH)_2$ + $Na_2CO_3$ + Fe acetate | 1 | 0 | 0 | 0.5 | 3E12 | 4E11 |

Table 3 shows that the use of iron nitrate results in a resistivity value $R_{max}$ four times lower than that of comparative Example 2 and one order of magnitude lower for $R_{300}$. Surprisingly the use of iron salts of different composition such as sulfate and acetate result in an increase of the resistivity, both for $R_{max}$ and for $R_{300}$ compared to the comparative Example 2. Note that the use of iron sulfate results in a resistivity that does not show lower values for $R_{300}$ compared to $R_{max}$.

Example Set D

A set of sorbent was prepared by taking the sorbents according to U.S. Pat. No. 7,744,678 and various copper salts have been added to measure the influence of the counter ion on the resistivity of the sorbent.

TABLE 4

Resistivity parameters of calcium hydroxide sorbents using different copper salts

| Example | Composition | $Na_2CO_3$ (wt. %) | $Cu(NO_3)_2$ (wt. %) | $CuSO_4$ (wt. %) | $CuCl_2$ (wt. %) | Cu citrate (wt. %) | Rmax ($\Omega \cdot$ cm) | R300 ($\Omega \cdot$ cm) |
|---|---|---|---|---|---|---|---|---|
| Example 2 | $Ca(OH)_2$ + $Na_2CO_3$ | 1 | 0 | 0 | 0 | 0 | 4E11 | 1E11 |
| Example 5 | $Ca(OH)_2$ + $Na_2CO_3$ + $Cu(NO_3)_2$ | 1 | 0.5 | 0 | 0 | 0 | 2E10 | 2E8 |
| Example 8 | $Ca(OH)_2$ + $Na_2CO_3$ + $Cu(SO_4)$ | 1 | 0 | 0.5 | 0 | 0 | 2E12 | 3E11 |
| Example 9 | $Ca(OH)_2$ + $Na_2CO_3$ + $CuCl_2$ | 1 | 0 | 0 | 0.5 | 0 | 3E12 | 6E11 |
| Example 10 | $Ca(OH)_2$ + $Na_2CO_3$ + Cu citrate | 1 | 0 | 0 | 0 | 0.5 | 7E12 | 2E12 |

It is clear from Table 4 that surprisingly all salts, except copper nitrate, increase the resistivity of the sorbent respective of the comparative Example 2.

It is to be mentioned that the examples of sorbent compositions presented herein above are not limitative for the present invention, and other additives in the amounts comprised between 0.1 and 5% in weight of the dry sorbent composition can be used to decrease the resistivity of sorbent compositions destined to be used in flue gas treatment processes using an electrostatic precipitator.

It is to be mentioned that improvements of particulate matter collection on collecting electrodes of an electrostatic precipitators can be observed with the use of the sorbent according to the present invention.

According to another aspect, the present invention is related to a flue gas treatment installation. FIG. 1 shows a schematic embodiment of a flue gas treatment installation 100 comprising an electrostatic precipitator 101 arranged downstream a first duct portion 102 arranged downstream an air preheater 103, characterized in that an injection zone 104 is arranged upstream said air preheater 103 and comprises a sorbent inlet 105. The said flue gas treatment installation 100 further comprises a reservoir 106 comprising said sorbent composition S to provide said sorbent composition to the said injection zone through the said sorbent inlet. The hot flue gas FG produced by a boiler 10 is flown through the injection zone wherein the sorbent S according to the invention is injected to react with $SO_2$ and other acidic gases from the flue gas, then the hot flue gas crosses the air preheater through which cold air CA is flown to absorb the heat of the hot flue gas and to be injected as hot air HA in the boiler. Then the flue gas flows through the electrostatic precipitator 101 wherein charged collecting electrodes collects the particulate matter including the sorbent composition according to the invention that has reacted with undesired acidic gases. The flue gas treatment installation described herein is relatively simple and is well adapted for the use of the sorbent composition according to the present invention.

Preferably the said flue gas treatment installation is used for treating flue gas of a power plant using coal or fuel containing sulfur species or other acid gas precursors.

It should be understood that the present invention is not limited to the described embodiments and that variations can be applied without going outside of the scope of the appended claims.

For example, in the preferred embodiment, the installation for flue gas treatment was described with an electrostatic precipitator downstream of an air preheater, said air preheater being connected to said electrostatic precipitator by a duct with an injection zone for injecting a sorbent composition according to the present invention arranged upstream of said air preheater. An alternative within the scope of the present may comprises a particulate collection device upstream of said preheater.

Another alternative of the flue gas treatment device according to the present invention comprises in sequence an electrostatic precipitator, a preheater followed by optionally a particulate collection device, before reaching the chimney.

The particulate collection device can be another electrostatic precipitator or any king of filter, such as a bag house filter.

In all of those embodiments, the sorbent composition according to the present invention is injected in an injection zone located upstream of said electrostatic precipitator, before or after the preheater, depending on the on-site configuration.

The invention claimed is:

1. A powdery calcium-magnesium compound comprising at least a calcium-magnesium carbonate content or a calcium-magnesium hydroxide content greater or equal to 80 weight %, doped with at least one metallic ion M, and at least one counter ion X,
   wherein the at least one metallic ion M is selected from the group consisting of $Cu^{2+}$, $Fe^{2+}$, and $Fe^{3+}$, $Mn^{2+}$, $Co^{2+}$ $Mo^{2+}$, $Ni^{2+}$, $Zn^{2+}$ in an amount greater than or equal to 0.05 weight % and lower or equal to 5 weight %;
   wherein the at least one counter ion X is selected from the group consisting of nitrates, nitrites and their mixtures at an amount greater than or equal to 0.05 weight % and lower or equal to 5 weight %,
   said weight percentages being expressed with respect to the total weight of the powdery calcium-magnesium compound, and
   said powdery calcium-magnesium compound presenting a resistivity at 300° C. (372° F.) ($R_{300}$) lower than 1E11 ($1\times10^{11}$) Ohms·cm and higher than 1E7 ($1\times10^{7}$) Ohms·cm.

2. A powdery calcium-magnesium compound according to claim 1, presenting a maximum (Rmax) lower than 1E11 ($1\times10^{11}$) Ohms·cm.

3. A powdery calcium-magnesium compound according to claim 1, wherein the total weight of said metallic ion and said counter ion is greater than or equal to 0.1 weight % and lower than or equal to 5 weight % with respect to the total weight of the powdery calcium-magnesium compound.

4. A powdery calcium-magnesium compound according to claim 1, further comprising sodium in an amount up to 3.5 weight % with respect to the total weight of the powdery calcium-magnesium compound, expressed as sodium equivalent.

5. A powdery calcium-magnesium compound according to claim 1, wherein said metallic ion M is selected from the group consisting of $Cu^{2+}$, $Fe^{2+}$, $Fe^{3+}$.

6. A powdery calcium-magnesium compound according to claim 1, wherein said at least one counter ion X is nitrate.

7. A powdery calcium-magnesium compound according to claim 1, presenting a BET specific surface area by nitrogen adsorption of at least 20 m²/g.

8. A powdery calcium-magnesium compound according to claim 1, presenting a BJH pore volume for pores having a diameter lower or equal to 1000 Å by nitrogen desorption of at least 0.1 cm³/g.

9. A sorbent composition for flue gas treatment installation including an electrostatic precipitator comprising a powdery calcium-magnesium compound, the powdery calcium-magnesium compound comprising at least a calcium-magnesium carbonate content or a calcium-magnesium hydroxide content greater or equal to 80 weight %, said powdery calcium-magnesium compound being doped with at least one metallic ion M, and at least one counter ion X,
   wherein the at least one metallic ion M is selected from the group consisting of $Cu^{2+}$, $Fe^{2+}$, and $Fe^{3+}$, $Mn^{2+}$, $Co^{2+}$, $Mo^{2+}$, $Ni^{2+}$, $Zn^{2+}$ in an amount greater than or equal to 0.05 weight % and lower or equal to 5 weight %;
   wherein the at least one counter ion X is selected from the group consisting of nitrates, nitrites and their mixtures at an amount greater than or equal to 0.05 weight % and lower or equal to 5 weight %,
   said weight percentages being expressed with respect to the total weight of the powdery calcium-magnesium compound, and
   said powdery calcium-magnesium compound presenting a resistivity at 300° C. (372° F.) ($R_{300}$) lower than 1E11 ($1\times10^{11}$) Ohms·cm and higher than 1E7 ($1\times10^{7}$) Ohms·cm.

10. A sorbent composition according to claim 9, further comprising a compound selected from the group consisting of activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash and water glass.

11. A sorbent composition according to claim 9, further comprising a sodium additive comprising sodium in an amount up to 3.5 weight % with respect to the total weight of the powdery sorbent composition and expressed as sodium equivalent.

12. A sorbent composition according to claim 9, wherein said calcium-magnesium compound is hydrated lime.

13. A sorbent composition according to claim 9, further comprising water in such an amount that the sorbent composition is under the form of a suspension.

14. A sorbent composition according to claim 13, where the sorbent composition is under the form of a milk of lime.

15. A process for manufacturing a sorbent composition comprising the powdery calcium-magnesium compound of claim 1, the process comprising the steps of:
   a) providing a calcium-magnesium compound to a reactor;
   b) adding an additive or a mixture of additives, comprising at least one metallic ion M and/or a counter ion X with M being a metallic ion having an atomic number less than or equal to 74 and being a transition metal ion or a post-transition metal ion, and X being one of the counter ions selected from the group consisting of nitrates, nitrites, oxides $O^{2-}$, and hydroxide OH— and their mixture in an amount calculated to obtain between 0.1 weight % and 5 weight % of said metallic ion M and for counter ion X based on the weight of dry sorbent composition.

16. A process according to claim 15, wherein said calcium-magnesium compound comprises at least a calcium-magnesium carbonate content greater or equal to 80 weight % with respect to the total weight of the dry calcium-magnesium compound.

17. A process according to claim 15, wherein said calcium-magnesium compound comprises a calcium-magnesium hydroxide content greater or equal to 80 weight %, with respect to the total weight of the dry calcium-magnesium compound.

18. A process for manufacturing a sorbent composition according to claim 15, characterized in that the said metallic ion M is selected from the group consisting $Cu^{2+}$, $Fe^{2+}$, $Fe^{3+}$, $Mn^{2+}$, $Co^{2+}$, $Mo^{2+}$, and $Zn^{2+}$.

19. A process for manufacturing a sorbent composition according to claim 15, characterized in that said metallic ion M is selected from the group consisting of $Cu^{2+}$, $Fe^{2+}$, $Fe^{3+}$.

20. A process for manufacturing, a sorbent composition according to claim 15, characterized in that said counter ion X is nitrate.

21. A process for manufacturing a sorbent composition according to claim 15, characterized in that it comprises a step of adding another additive comprising sodium expressed as sodium equivalent in an amount calculated to obtain up to 3.5% of sodium equivalent in weight of the dry sorbent composition.

22. A process for manufacturing a sorbent composition according to claim 15, characterized in that it further comprises a step of adding a compound selected from the group consisting of activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, an organic sulphide, calcium sulfate, open-health coke, lignite dust, fly ash and water glass.

23. A process according to claim 15, wherein said step of providing a calcium-magnesium compound to a reactor comprises the steps of providing a quicklime to said reactor, slaking said quicklime with a predetermined amount of water to obtain said calcium-magnesium compound comprising at least a calcium hydroxide content greater or equal to 80 weight %, with respect to the total weight of the dry calcium-magnesium compound with an predetermined amount of moisture.

24. A process for manufacturing a sorbent composition according to claim 23, characterized in that said step of slaking is performed in conditions such as to obtain hydrated lime with a BET specific surface area by nitrogen adsorption of at least 20 $m^2$/g.

25. A process for manufacturing a sorbent composition according to claim 23, characterized in that said step of slaking is performed in conditions such as to obtain hydrated lime with a BJH pore volume for pores having a diameter lower or equal to 1000 Å by nitrogen desorption of at least 0.1 $cm^3$/g.

26. A process for manufacturing a sorbent composition according to claim 23, wherein said step of adding an additive or a mixture of additives, comprising at least one metallic ion M and/or a counter ion X is performed, before, during or after said step of slaking quicklime.

27. A flue gas treatment process comprising a step of injecting into flue gas, in an injection zone arranged upstream of an electrostatic precipitator, a sorbent composition, wherein the sorbent composition comprises the powdery calcium-magnesium compound of claim 1.

28. A flue gas treatment process according to claim 27, wherein the sorbent composition comprises as a powdery calcium-magnesium compound at least a calcium-magnesium carbonate, and wherein said sorbent composition is injected in said injection zone, wherein said flue gas has a temperature greater than or equal to 850° C. (1562° F.).

29. A flue gas treatment process according to claim 27, wherein the sorbent composition comprises as a powdery calcium-magnesium compound at least a calcium-magnesium hydroxide, and wherein said sorbent composition is injected in said injection zone wherein said flue gas has a temperature greater than or equal to 180° C. (356° F.).

* * * * *